Feb. 8, 1949. N. F. ANDREWS ET AL Re. 23,083

CORN HARVESTER

Original Filed May 23, 1941 6 Sheets-Sheet 1

INVENTORS
Norman F. Andrews
Russell L. Hart
BY
E. C. Boff & C. T. Parker
ATTORNEYS.

CORN HARVESTER

Original Filed May 23, 1941 6 Sheets-Sheet 2

INVENTORS:
Norman F. Andrews and
Lowell L. Dart
BY
C. B. Griffith & C. Parker
ATTORNEYS.

CORN HARVESTER

Original Filed May 23, 1941 6 Sheets-Sheet 3

INVENTORS:
Norman F. Andrews & Russell L. Dort
BY
Jeffery C. Parker
ATTORNEYS

CORN HARVESTER

Original Filed May 23, 1941 6 Sheets-Sheet 4

INVENTORS:
Norman F. Andrews +
Russell L. Hart
BY E. C. Parker

Feb. 8, 1949. N. F. ANDREWS ET AL Re. 23,083

CORN HARVESTER

Original Filed May 23, 1941 6 Sheets-Sheet 5

INVENTORS:
Norman F. Andrews & Russell L. Dort
BY
E. E. Boff & C. T. Parker
attorneys

CORN HARVESTER

Original Filed May 23, 1941 6 Sheets-Sheet 6

INVENTORS:
Norman F. Andrews & Russell L. Dort
BY
E. A. Boff and C. T. Parker
ATTORNEYS Reissued Feb. 8, 1949

Re. 23,083

UNITED STATES PATENT OFFICE 23,083

CORN HARVESTER

Norman F. Andrews, Moline, Ill., and Russell L. Dort, Davenport, Iowa, assignors to Deere & Company, Moline, Ill., a corporation of Illinois Original No. 2,347,871, dated May 2, 1944, Serial No. 394,806, May 23, 1941. Application for reissue January 19, 1946, Serial No. 642,209

41 Claims. (Cl. 56—18)

The present invention relates generally to corn harvesters and more particularly to corn harvesting implements of the type adapted to be mounted on and carried by a tractor, and has for its principal object the provision of a tractor-mounted corn harvester that is considerably lighter in weight and less expensive to manufacture, but is rugged, strong and durable, and operates with improved efficiency.

In connection with the provision of a corn harvester of lighter weight, an object of this invention relates to the provision of a gatherer fabricated entirely of sheet metal construction, without the use of relatively heavy structural beams, but without sacrifice in strength or rigidity.

Another object of this invention relates to the provision of new and improved means for supporting the implement on the tractor body, with provision for vertical adjustment of the gatherer units. In the accomplishment of this object, the gatherers are swingably supported by means including a main transversely extending supporting beam attached to the tractor between the front and rear wheels thereof, and the husking unit is swingably mounted on a link supported on the rear axle housing of the tractor and pivotally connected to the rear end of the gatherer unit.

Still another object relates to the provision of a simplified but more efficient husking mechanism and more specifically, it is an object of this invention to provide conveying means for moving ears of corn over the husking rolls, which is especially adapted to maintain the ears in a position parallel to the axes of the rolls and in engagement with both of the latter to insure that the husks and silks are quickly and thoroughly removed therefrom.

Another object has to do with the provision of an ear conveyor between the snapping rolls and the husking rolls, the paddles of which disengage themselves more efficiently and quickly from the ears at the point of discharge.

A further object of this invention relates to the provision of a separating device in connection with the husking unit, which effectively removes dirt and other fine particles from the husks and silks which are separated from the ears by the husking rolls, then removes any kernels of corn which may be carried along with the husks, delivering them to the wagon elevator along with the ears of corn, and finally discharges the husks and silks upon the ground, or to any desired receptacle separate from the corn.

Still another object relates to the provision of a fan for directing a single blast of air through the ears of corn from the husking rolls and through the kernels of corn from the husk conveyor, as they fall to the elevator hopper.

Still a further object relates to the provision of novel means for raising the corn harvesting implement into position to be mounted on the tractor. In the accomplishment of this object, the gatherer is mounted on a transversely extending supporting beam, which is rotatable relative to the gatherer, and in the case of a two-row harvester, the supporting beam extends transversely beneath the tractor frame and supports a gatherer at each end thereof in a position alongside the opposite sides of the tractor, respectively. The transverse supporting beam is connected to the body of the tractor by a pair of laterally spaced chains or other flexible connecting means, which can be wound upon the beam by rotating the latter and thus raising the implement into mounted position on the tractor. In connection with a two-row mounted implement, it is a further object to provide means for assisting the front wheels of the tractor to roll over the transverse supporting beam when the latter is near the ground in lowered position. A related object has to do with the provision of means for properly positioning this ramp as the implement is lowered to the ground, so that the tractor can be backed out of the implement frame without any further attention to the ramp.

Still a further object of this invention relates to the provision of rollers at the forward end of the implement frame adjacent the front wheels of the tractor and adapted to engage the latter when they are turned during the steering operations, to insure that the wheels do not catch upon and damage any part of the implement mechanism.

Another object of this invention relates to the provision of a novel spout at the end of the wagon elevator, which tends to distribute the ears of corn in the wagon to obviate the necessity of moving the wagon fore and aft relative to the wagon elevator or vice versa.

These and other objects and advantages of the present invention will be apparent to those skilled in the art after a consideration of the following description, in which reference is had to the drawings appended hereto, in which Figure 1 is a plan view of a two-row tractor mounted corn harvesting implement attachment, embodying the principles of the present invention, the hood of the left hand gatherer unit being removed to show the gathering and conveying mechanism beneath;

Figure 12:
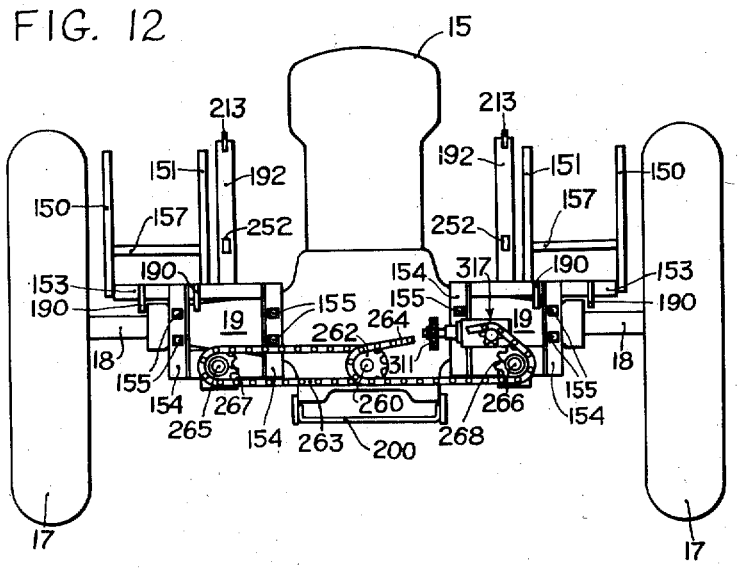
Figure 13:
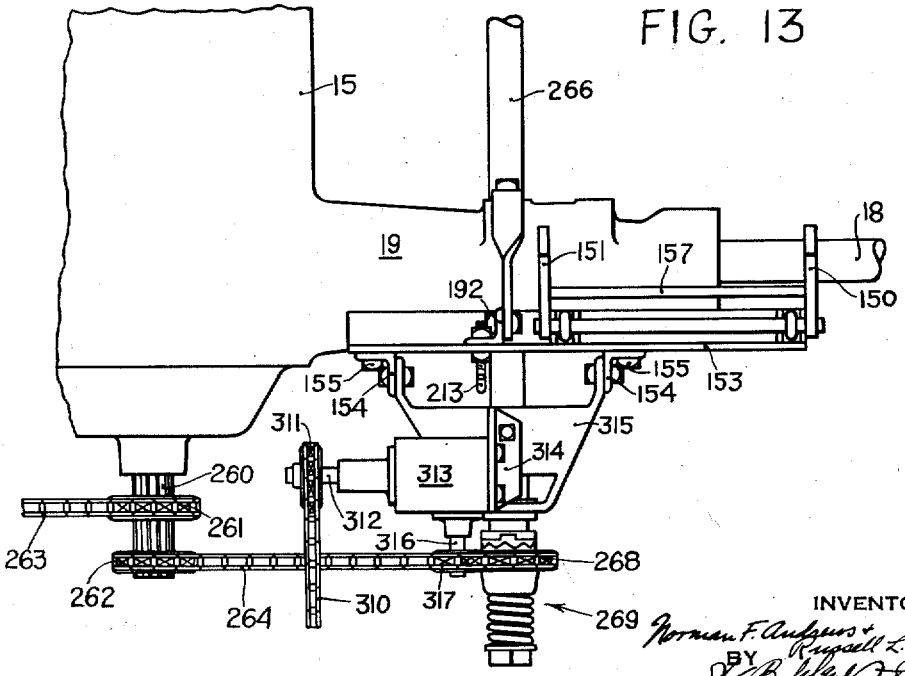

Figure 12 is a rear view of the tractor showing the framework mounted on the rear axle housing on which the implement is supported, together with the mechanism for driving the various parts of the implement mechanism from the power take-off shaft of the tractor; and Figure 13 is a fragmentary plan view, drawn to an enlarged scale, of the supporting framework on the right hand side of the tractor axle housing.

Referring now to the drawings, the tractor or mobile frame comprises a narrow longitudinally extending body 15, supported on a pair of closely spaced dirigible front wheels 16 and a pair of comparatively widely spaced rear traction wheels 17, fixed to a pair of laterally extending axles 18, which are journaled in the usual axle housing 19 which forms an integral part of the tractor body.

Figure 5:
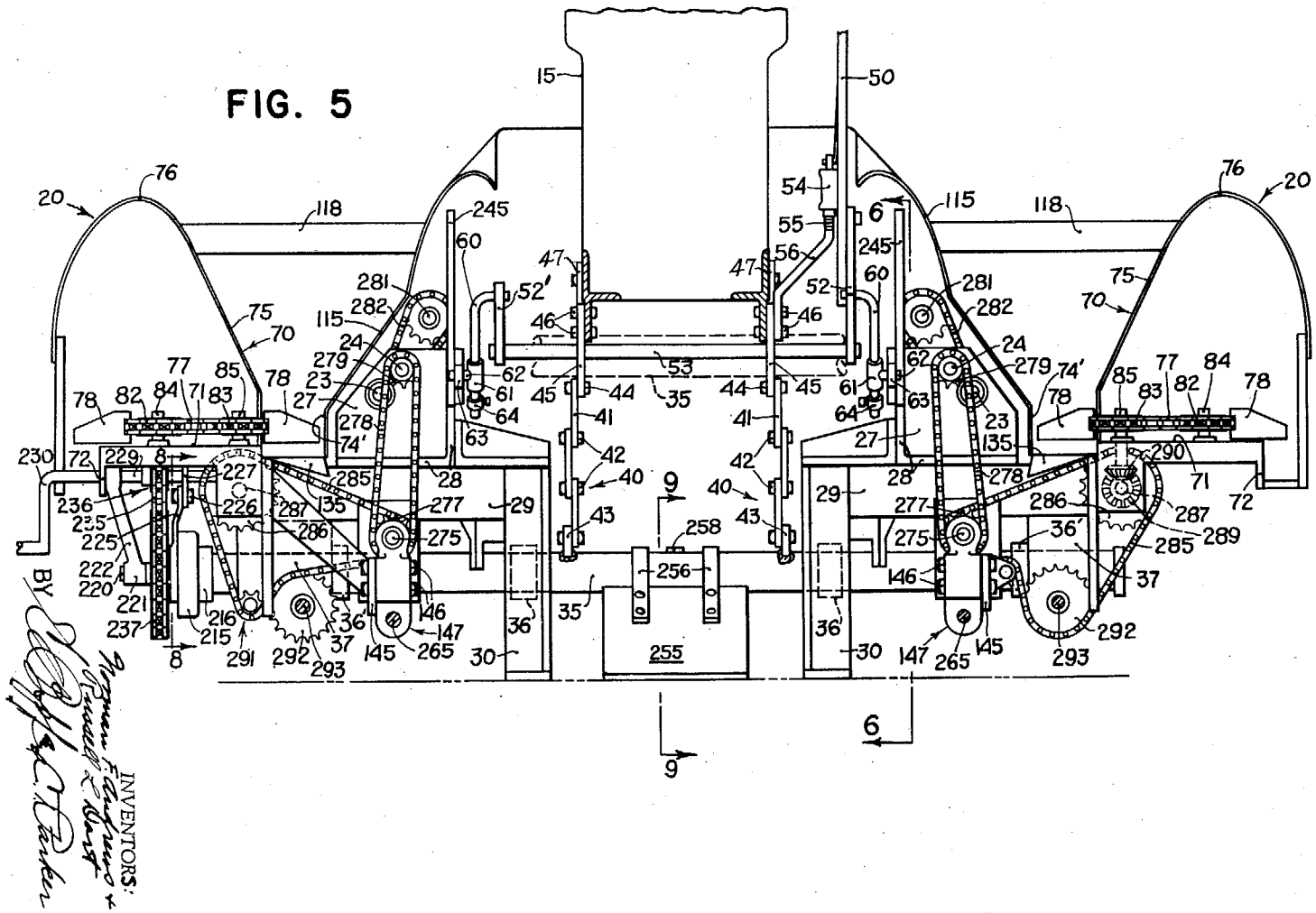
Figure 5 is an elevational view taken in section along a generally transverse vertical plane passing through the tractor showing the rear of the gatherer units lowered to the ground and the husking units removed, as indicated generally by the line 5—5 in Figure 4.

The corn harvesting implement attachment includes a pair of crop gathering, picking or snapping units 20 disposed on opposite sides of the tractor body 15 adjacent the forward end thereof. Each picking unit 20 comprises a pair of cooperative snapping rolls 21, 22, mounted on shafts 23, 24, respectively, which are supported at their lower ends in conventional bearings 25 fitted between the tapered point 26 of the rolls and the cylindrical body thereof in the usual manner. The upper ends of the shafts 23, 24 are journaled in suitable bearings (not shown) mounted on a transversely disposed supporting plate 27. The supporting plate 27 has a flange 28 turned at right angles thereto, extending along the bottom and inner side edges thereof. The flange 28 along the bottom edge of the plate 27 is fastened to a transversely disposed frame member 29 comprising a hollow beam member of rectangular cross section. The two frame members 29 in their respective picker units 20, terminate at their inner ends adjacent the sides of the tractor, and fixed rigidly to the inner ends of the frame members 29 is a pair of downwardly extending legs 30, respectively, which serve as supports for the picker units when the latter are resting upon the ground, as indicated in Figure 5.

Figure 6:
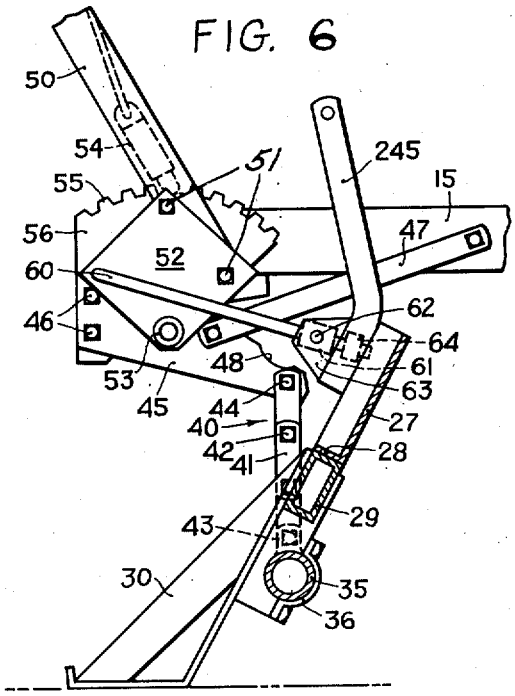
Figures 6 and 7 are enlarged sectional elevational views of the lifting and supporting mechanism in lowered and raised positions, respectively, and the mechanism for tilting the implement relative to the tractor, taken along the line 6—6 in Figure 5.
Figure 7:
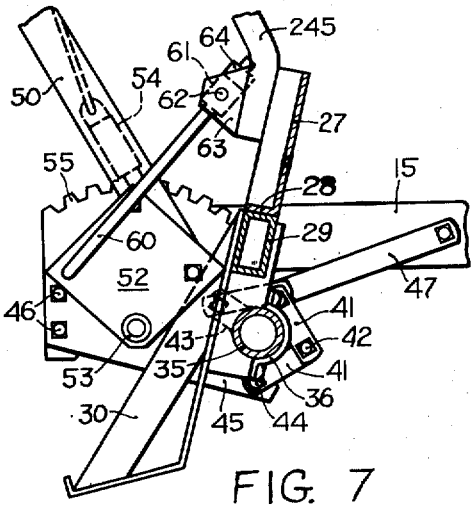
Figure 8:
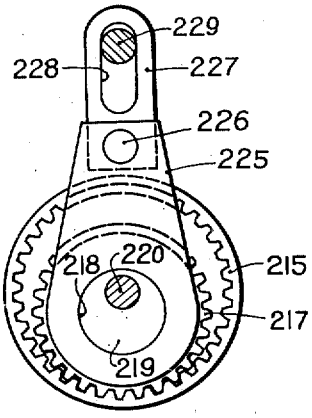
Figure 8 is an elevational view taken along a line 8—8 in Figure 5, showing the details of the reduction gear, by means of which the main supporting beam is rotated to raise and lower the implement relative to the tractor.

The two picker units 20 are mounted on a common transverse supporting beam 35, connected to the frame members 29 by means of a pair of inner journal bearings 36, which are mounted on the forward side of the legs 30, and a pair of outer journal bearings 36′ on the forward sides of a pair of outwardly spaced supporting plates 37, the latter being fixed to the transverse frame member 29 at points spaced outwardly of the legs 30. The main supporting beam 35 comprises an implement portion common to both picker units and is in the form of a cylindrical pipe, which extends transversely beneath the tractor between the front dirigible wheels 16 and the rear traction wheels 17. The beam 35 is connected with the tractor body 15 by means of a pair of laterally spaced flexible lifting members 40 comprising a plurality of short links 41 interconnected by bolts 42 and thus providing chains which are connected at their lower ends by bolts to a pair of lugs or ears 43, rigidly fixed as by welding to the pipe beam 35 in axial alignment thereon. The upper ends of the lifting chains 40 are swingably connected by pivot bolts 44 to a pair of mounting members in the form of supporting arms 45, respectively, the arms 45 being rigidly bolted at 46 to the side of the tractor body 15 and are braced by a pair of forwardly extending braces 47 which are also bolted at their forward ends to the side of the tractor body, as best illustrated in Figure 6. The implement is raised bodily into normal operating position on the tractor by rotating the pipe member 35 in a counterclockwise direction as viewed in Figure 6. Thus, the pipe 35 acts as a drum on which is wound the chain of links 40 and in the last portion of the winding movement, the pipe 35 is rotated to a position on top of the two supporting arms 45, the latter being formed at their forward ends with a curved recess or shallow slot 48 adapted to receive the pipe 35 in its raised position, as illustrated in Figure 7. The means for rotating the pipe beam 35 will be described later. The beam 35 and chains 40, together with the means for rotating the beam constitute a jacking device for raising the harvester from an inoperative position on the ground to an operative position on the tractor. Since the jacking device has provision for locking the same to hold the harvester in operative position, it serves as a mounting means for the harvester.

Since the frames of the picker units are journaled on the main supporting pipe beam 35, they can be tilted about the main axis of the beam 35 when the latter is in its raised position. This tilting is accomplished by means of a hand lever 50, which is rigidly secured by bolts 51 to a vertically disposed plate 52, the latter being rigidly mounted as by welding on the outer end of a rock shaft 53, which is journaled in the two arms 45 for rocking movement about a transversely extending axis. An arm 52′ is fixed to the rock shaft 53 at the opposite side of the tractor. The plate 52 and arm 52′ are provided with pivoted links 60, the rear ends of which are turned at right angles into a suitable aperture in the arm 52' and in the rear corner of the plate 52, and the links extend forwardly through sleeves 61, which are pivotally connected by bolts 62 to plates 63, the latter being fixedly attached to the vertical flanges 28 of the plates 27, respectively. The forward end of each link 60 is provided with an adjustable collar 64, which engages the sleeve 61 when the lever 50 is swung rearwardly, to swing the main transverse frame member 29 rearwardly with respect to the pipe member 35 and thus to raise the forward end of each picker unit to adjust the height of the forward ends of the snapping rolls 21, 22 above the ground. By virtue of the sliding connection between the link 60 and the sleeve 61, however, the forward end of either picker unit is free to be pushed upwardly if it should encounter an obstruction in the field. The lever 50 is held in adjusted position by means of a suitable latch 54 which engages a notched sector 55 supported on brackets 56 which are rigidly bolted to the side of the tractor.

Figure 1:
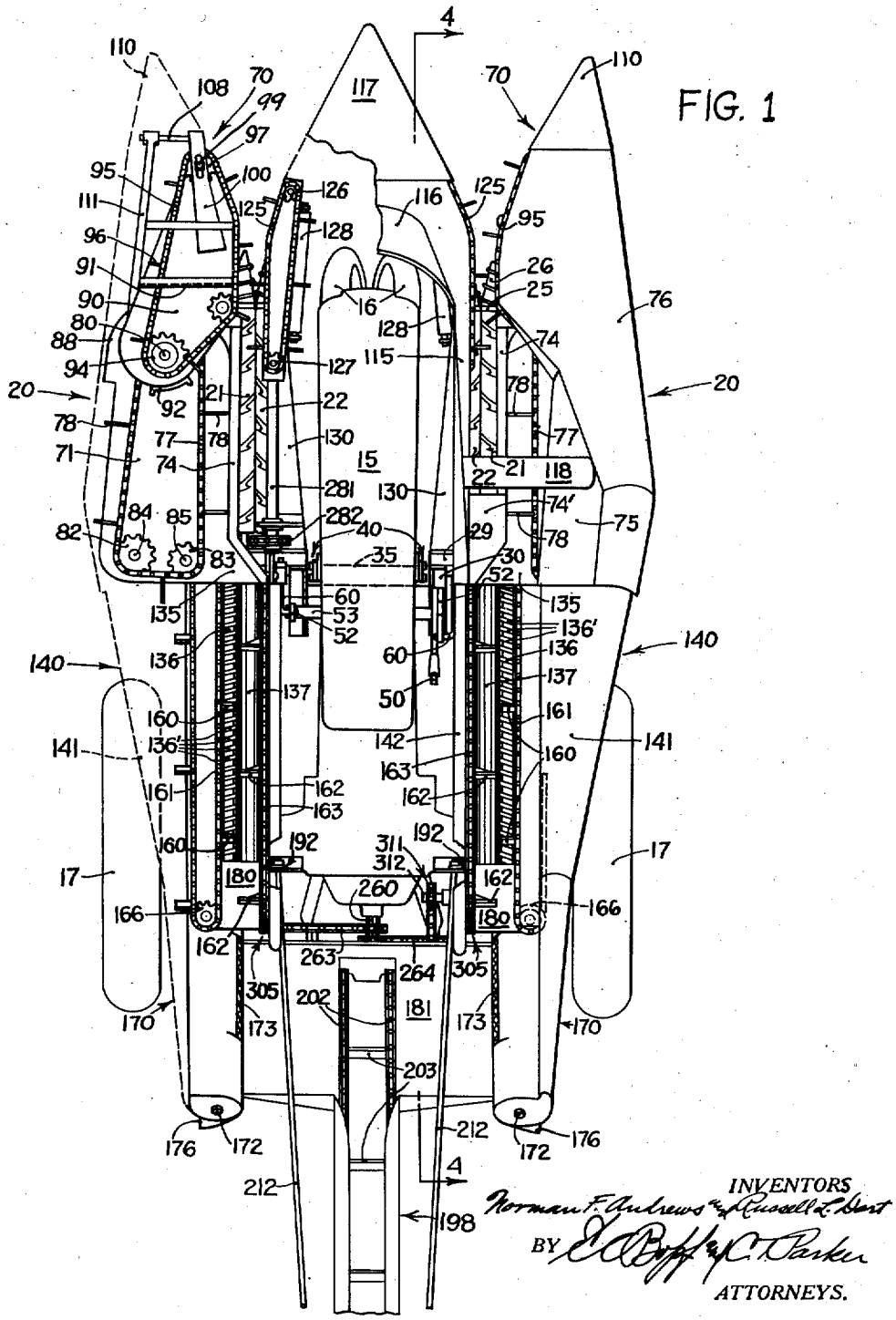
Figure 3:
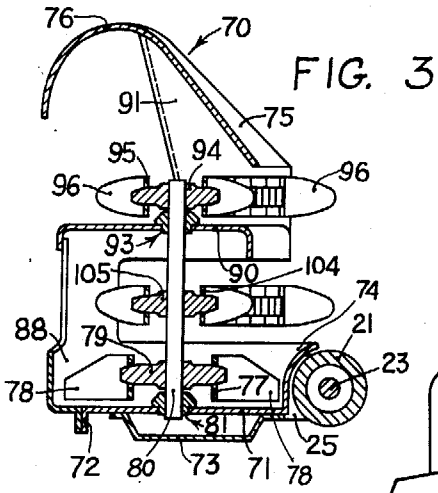
Figure 3 is an enlarged sectional elevational view taken through one of the gatherer units along a line 3—3 in Figure 2.

With the exception of the main supporting beam 35 and the individual transverse frame members 29 of the two opposite picker units 20, the frame structure of each of the picker units is constructed almost entirely of sheet metal sections for the sake of lightness and to save expense. Each of the outer gatherers 70 includes a forwardly and downwardly inclined lower sheet 71 having a downwardly turned outer edge flange 72, the sheet 71 being supported adjacent its rear end on the transverse beam 29. Rigidly attached beneath the sheet 71 and extending forwardly from the cross beam 29 is a trough-shaped sheet metal reenforcing member 73, which is relatively deep at its rear end and tapers to a shallow section near the forward end of the sheet 71, and thus provides a beam of tubular box section for supporting the outer snapping roll. This is appreciably lighter, yet stronger than conventional structural frame members. The inner longitudinal edge of the sheet 71 is provided with an upwardly and inwardly directed flange 74 (see Figures 1 and 3), which overhangs the outer side of the outer snapping roll 21 and serves as a conveyor trough for the ears of corn separated from the stalks by the snapping rolls 21, 22. The opposite side of the conveyor trough is defined by a generally vertically disposed sheet metal wall 75, which rises upwardly and outwardly and is curved over the top; as at 76, to serve as a guide for the cornstalks.

A conveyor comprising an endless chain 77 and paddles 78, is trained around a sprocket 79 which is fixed to a shaft 80 journaled at its lower end in a bearing 81 in the sheet 71 adjacent the forward end of the latter. The inner flight of the chain 77 moves the paddles 78 upwardly and rearwardly in the conveyor trough adjacent the snapping rolls 21, 22 and thus moves the ears of corn away from the snapping rolls toward the rear of the implement. At its upper end, the conveyor chain 77 passes around a pair of sprockets 82, 83 mounted on shafts 84, 85, respectively, which are supported in the sheet 71 in suitable journal bearings. The outer flight of the conveyor chain 77 passes forwardly along the outer edge of the sheet 71 to the sprocket 79 at the forward end. The forward end of the sheet 71 is curved to conform approximately with the path of the outer ends of the paddles 78 and is provided with a sheet metal wall 88, which is curved in conformity with the rounded front end of the sheet 71 and rises substantially perpendicular thereto and serves the purpose of catching any ears of corn that tend to fall forwardly in the path of the conveyor 78 before they are engaged by one of the paddles. The wall 88 also serves as a part of the sheet metal frame of the picker.

Spaced above the sheet 71 is a second sheet 90, disposed in a substantially parallel plane with the plane of the sheet 71 and extending forwardly of the forward end of the latter. The sheet 90 is fixedly attached to the upper end of the wall 88 and also is fixed to the side wall 75 of the gatherer. A transversely extending sheet metal brace 91 extends between the top of the sheet 90 and the under side of the curved portion 76 of the gatherer. A channel-shaped sheet metal brace 92 is connected between the upper and lower sheets 90, 71 at the rounded rear end of the upper sheet 90. To this brace 92, is also connected the forward end of the side wall 75 of the conveyor trough.

The shaft 80 on which is fixed the sprocket 79 at the forward end of the elevator chain 77, is journaled at its lower end in a bearing 81 mounted on the lower sheet 71, and extends upwardly therefrom generally perpendicular to the sheet 71, through an aligned aperture in the upper sheet 90, and is supported in a bearing 93 fixed to the upper sheet 90. The shaft 80 is extended above the bearing 93 and supports at its upper end, a sprocket 94, around which is trained a gatherer chain 95 having outwardly projecting lugs 96 for engaging the stalks of corn to gather the latter into the snapping rolls 21, 22. The gatherer chain 95 extends forwardly along the outer edge of the sheet 90 from the sprocket 94, and passes around a lower sprocket 97, which is journaled in a lower bearing 98 fixed at the forward end of the sheet 90, and in an upper bearing 99 which is supported on an arm 100, mounted at its rear end in the center of the sheet 90 and extending forwardly therefrom above the sprocket 97 at the forward end of the sheet 90. A second gatherer chain 104 is trained around a sprocket 105, which is fixed to the shaft 80 intermediate of the sheets 90, 71, and around a forward sprocket 106, which is journaled in a bearing 107, mounted beneath the upper sheet 90. The forward end of the arm 100 is also provided with a transversely extending frame member 108, to which is pivotally connected a supporting arm 109, to which is attached a floating gatherer point 110, which swings about the pivot point of the arm 109 on the frame member 108. A brace rod 111 extends rearwardly and outwardly from the frame member 108 and is fixed to the forward end of the lower sheet 71.

The inner gatherer comprises a pair of side walls 115 extending alongside the tractor on opposite sides thereof and converging forwardly of the tractor and interconnected by a rounded hood 116 extending around the front end of the tractor. A floating gathered point 117 is supported on the forward ends of the converging walls 115 in any suitable manner, as is well-known to those skilled in the art. The inner side walls 115 are connected with the walls 75 on the opposite gatherer by means of a tubular sheet metal bracing member 118 extending over the ear conveyor and over the upper end of the snapping rolls 21, 22 on each side of the tractor.

A pair of inner gatherer chains 125 are trained around a pair of fore and aft spaced pulleys 126, 127, supported on the inner gatherer walls 115. Also journaled on the inner gatherer walls 115 on fore and aft extending axes are a pair of longitudinally extending rollers 128 at each side of the front wheels 16 of the tractor and are adapted to engage the latter if the wheels are turned too sharply in either direction, thus preventing damage to either the tires or the chains 125. A pair of sheet metal beams 130 of tubular box section, extend forwardly from the inner end of each of the transverse beams 29 for supporting each of the inner snapping rolls.

The upwardly extending flange 74 along the inner side of the lower sheet 71 is extended upwardly and inwardly across the upper ends of the snapping rolls 21, 22, as indicated at 74' (see Figures 1 and 5), and serves to cover the upper snapping roll bearings. The inner rear corner of the sheet 71 is curved downwardly and inwardly behind the inclined flange extension 74', as indicated at 135. This causes the ears of corn, which are moved upwardly and rearwardly by the paddles 78, to slide inwardly toward the tractor body and away from the paddles at the upper end of the conveyor, as the ears drop onto the husking rolls 136, 137. At the same time that the ears slide inwardly, the paddles turn outwardly as the chain 77 moves around the sprocket 83, and by the virtue of the second sprocket 82 disposed directly outwardly from the sprocket 83, the chain moves substantially at right angles away from the conveyor trough. This has been found to provide a better and more efficient disengagement of the paddles from the ears than a conveyor in which the chain turns approximately 180 degrees around the upper sprocket 83.

Each of the crop treating or husking units, indicated generally by reference numeral 140, comprises a sheet metal trough having longitudinally extending side walls 141, 142 disposed substantially in fore and aft alignment with the side walls 75, 115 of the gatherer unit 70. The forward end of each husking unit 140 is rigidly mounted on a generally triangular plate member 143 (see Figure 4), which is pivotally connected by a bolt 144 to the rear end of a supporting arm 145, which is rigidly connected by bolts 146 to the side of a gear housing 147 which is rigidly mounted on the transverse frame member 29.

Each of the husking units is supported intermediate of its ends on a pair of laterally spaced legs 150, 151 disposed on the outer and inner sides of the husking unit 140, respectively, and pivotally connected thereto by bolts 152. The lower ends of the legs 150, 151 are pivotally supported for swinging movement about a transverse axis, on a transversely disposed structural frame member 153 which is mounted on the upper end of a pair of vertically disposed laterally spaced angle bars 154, each of which is rigidly bolted by stud bolts 155 to an implement supporting boss 156 integrally formed on the rear side of the tractor axle housing 19. The two legs 150, 151 are interconnected by a cross bar 157 into a single rigid structure. Thus it is evident that when the picking units are rocked by the lever 50 about the axis of the tubular beam 35, the husking units 140 are free to swing relative to the tractor to maintain proper alignment with the picking unit. Furthermore, the picking units can be lowered to the ground until they rest on the legs 30 without disconnecting the upper ends of the husking units from the supporting legs 150, 151, thus facilitating assembly and disassembly on the tractor, as will be explained in detail later.

A pair of laterally spaced longitudinally extending husking rolls 136, 137 are journaled in each husking unit between the walls 141, 142. The inner husking roll 137 is a smooth cylindrical roll made of hard wood, preferably hickory maple or hickory. The other roll 136 is made of firm rubber, about the consistency of the tread of an automobile tire, and is helically grooved to provide helical ridges 136', which have closely spaced axially extending notches therein. This combination of smooth hard wood and helically grooved rubber rolls provides a highly efficient and long wearing husking mechanism which gives good results over a wide range of crop conditions and weather conditions. In view of the high efficiency at which these rolls operate, it is possible to husk all the ears of corn as fast as they are picked, using only one pair of husking rolls. In order to operate efficiently, however, it is necessary to insure that the ears of corn are immediately aligned parallel with the rolls and between the latter as soon as the ears fall from the upper end 135 of the conveyor trough, for if the ears are merely rolled over the rolls in a transverse position, the rolls are unable to take hold of the husks. Heretofore, husking rolls have been provided with ear conveyors of the endless chain type to move the ears along the rolls, but such conveyors have generally been provided with ear-engaging paddles which extend across the two rolls, so that if an ear falls upon the rolls in a transverse position, it is very likely to be moved from one end of the husking rolls to the other without being properly aligned therewith. According to the principles of the present invention, however, the husking rolls are provided with a pair of conveyors, one on each side of the husking rolls, and having ear engaging paddles which extend only about half-way across the pair of husking rolls. That is to say, each of the paddles 160, attached to the outer conveyor chain 161, extends inwardly over the grooved rubber roll 136, terminating adjacent the longitudinal central vertical plane of the pair of rolls, preferably just short of the central plane. Each of the paddles 162 attached to the inner conveyor chains 163 extends only over the wooden rolls 137, terminating adjacent the longitudinal central plane of the pair of rolls. With this arrangement, an ear falling from the end 135 of the conveyor trough transversely of the pair of rolls will be engaged at one end or the other by one of the paddles 160 or 162 which are staggered in order that the paddles will engage only one end of the ear and swing it around in alignment with the husking rolls. Thus it is evident that it is practically impossible for an ear to be moved transversely along the entire length of the husking rolls, for the staggered arrangement of short conveyor paddles is very effective in aligning the ear with the rolls and thereafter moving the ears lengthwise along the roll. The rolls are rotated in such direction that the helical grooves and ridges tend to move the ears of corn rearwardly along the rolls and thus further assist in delivering the ears to the rear of the machine.

It will be noted that the inner conveyor chains 163 are each disposed in a vertical plane and are trained around a pair of sprockets 305 rotatable about transversely extending axes. The lower or return flight of each inner chain 163 passes downwardly under an additional pair of sprockets 165. Each of the outer chains 161 is trained around a pair of sprockets 166 which are disposed on generally vertical shafts and thus the outer chains 161 are disposed in a transversely extending plane. This arrangement of conveyor chains provides for compactness and efficient operation.

Disposed beneath the pair of husking rolls on each side of the implement is a U-shaped trough 170 extending longitudinally of the husking rolls and adapted to receive the husks and silks which are removed from the ears by the rolls. An auger conveyor 171 is disposed longitudinally within each trough 170 and comprises a helically formed vane fixed to a shaft 172. The trough 170 is perforated finely, so that any dust or particles of grit are dropped through the perforations but the kernels of corn are retained in the trough. The trough 170 is extended rearwardly beyond the rear end of the husking roll conveyor and is provided with a section of coarsely perforated mesh 173 through which the kernels of corn are free to pass, but which is fine enough to retain the husks and silks. The kernels of corn are discharged laterally inwardly over chutes 177, while the husks and silks are moved rearwardly to a discharge opening 174 on the outside of each of the troughs. The auger 171 is provided with a straight blade 175 at the rear end in order to sweep the husks and silks laterally outwardly over a pair of chutes 176, thus discharging the husks and silks upon the ground at the rear of the implement.

The paddles 160, 162 of the ear conveyors move the husked ears rearwardly over an apron 180 at the rear end of each pair of husking rolls. These aprons 180 are curved downwardly at their rear ends to discharge the ears of corn at the rear end of the implement on each side of the tractor, into a hopper 181 which extends across the rear end of the tractor. The section of coarse mesh 173 in each of the troughs 170 is disposed adjacent the rear ends of the apron 180 so that any kernels of corn that might be carried in the husks and silks, can be discharged into the hopper 181 through the mesh 173.

As the kernels of corn drop from the mesh 173 over the chute 177 and as the ears drop from the apron 180, any loose dirt or chaff that may fall therewith into the hopper 181 is separated therefrom by a blast of air directed from a pair of fans 182, 183 disposed beneath the two aprons 180 at the opposite sides of the implement, and having exhaust ducts 184 extending upwardly and rearwardly to direct air blasts between the husking units and the hopper 181. Each of the fans is journaled on a supporting frame 188 which is swingably mounted by means of suitable pivot bolts 189 on a pair of supporting ears 190 fixed to the back side of the transverse frame member 153. Each of the frames 188 is supported by a tension link 191 connected to a vertical post 192 which is rigidly mounted on the horizontal member 153. Each of the links 191 is provided with an adjustable nut 193 by means of which the frame 188 and fan 183 can be adjusted vertically about the axis of the pivot bolts 189 for the purpose of adjusting the direction of the air blast and also for tightening and loosening the fan driving belts 194, the latter being trained around pulleys 195 attached to the fan shaft.

Figure 10:
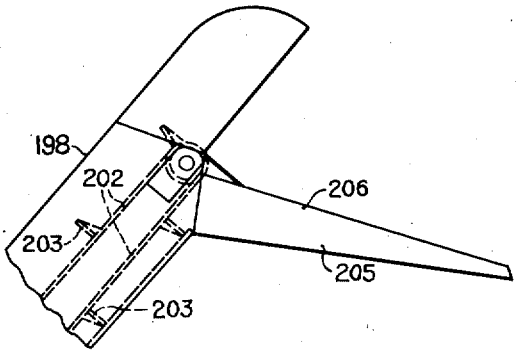
Figure 10 is a fragmentary elevation view showing the upper end of the wagon elevator and the ear distributing spout.
Figure 11:
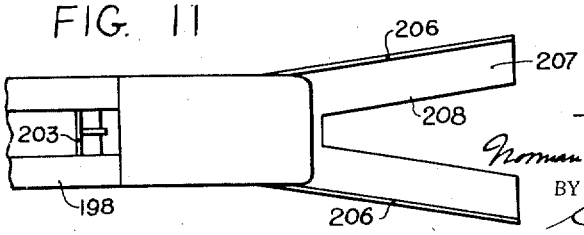
Figure 11 is a plan view of the mechanism shown in Figure 10.

The hopper 181 is mounted on and discharges into a grain elevator 198 mounted on a supporting framework 199 that is rigidly attached to the drawbar support 200 of the tractor. The frame 199 is also supported by a pair of forwardly and upwardly extending tension members 201, which are rigidly bolted to the transverse frame members 153 on opposite sides of the tractor axle housing. The conveyor 198 includes a pair of endless chains 202 extending around suitable pulleys at the lower and upper ends of the conveyor 198, respectively, having transverse conveyor paddles 203 connected to the opposite chains 202. The ears and kernels of corn in the hopper 181 feed downwardly into the conveyor and are conveyed upwardly and rearwardly and discharged from the upper or rear end thereof. (See Figures 10 and 11.)

Attached to the upper end of the conveyor, is a discharge spout 205 having rearwardly diverging side walls 206 and a bottom wall 207. The bottom wall 207 is provided with a slot 208 which widens toward the rear end of the spout 205 and thus serves to distribute the ears of corn over the wagon in a longitudinal direction, as some of the ears fall endwise through the narrow forward end of the slot 208, while others of the ears drop upon the spout in a transverse position and thus roll rearwardly down the spout until they fall though a wider portion of the slot. Still others of the ears slide longitudinally down one of the side portions of the bottom wall 207 of the spout and drop off the rear end thereof. This type of spout has been found very effective in distributing the ears of corn evenly over the bottom of the wagon, which is drawn behind the tractor in a conventional manner.

The elevator 198 is supported at its lower end on the shaft 210 on which the lower pulley is mounted, the shaft 210 being journaled at opposite ends thereof in a pair of supports 211 which are mounted on the supporting framework 199. The conveyor 198 is thus swingable about the transverse axis of the shaft 210 but is held in upwardly and rearwardly inclined position by a pair of tension rods 212 which are attached to the sides of the elevator by any suitable means (not shown) and attached at their forward ends to a pair of eye bolts 213, fixed to the upper ends of the posts 192, respectively.

It has been mentioned that the corn harvesting implement is raised and lowered relative to the tractor to and from its normal operating position thereon, by rotating the main supporting pipe beam 35. The means for rotating this beam by hand will now be described. Referring more particularly to Figures 5, 6, 7 and 8, the left hand end of the beam 35 is provided with an internal gear member 215 having a hub 216 rigidly fixed to the end of the beam 35. A spur gear 217 is disposed within the internal gear member 215 in meshing engagement therewith and in eccentric relation thereto. The spur gear 217 is provided with a cylindrical bore 218, which is concentric with the circumference of the spur gear 217, and journaled within the bore 218 is a cylindrical disc 219 rigidly attached to a shaft 220 which is disposed in eccentric relation thereto. The shaft 220, however, is disposed coaxially with the beam 35 and is journaled in a bearing member 221 at the lower end of an arm 222 which is rigidly supported on the lower side of the sheet 71. The inner end of the shaft 220 is rotatably supported in a suitable journal bearing (not shown) within the cylindrical pipe beam 35. By rotating the shaft 220, the spur gear 217 is moved by the eccentric disc 219 in an orbit about the internal gear 215, and by virtue of the different number of teeth in the spur gear 217 and the internal gear 215, it is evident that in one cycle of orbital movement of the spur gear 217 within the internal gear 215, there is a relative rotation of the two gears 215, 217, which is a function of the difference in the number of teeth in the two gears. The spur gear 217 is held against rotation by means of an arm 225, fixed to the gear 217 and extending radially therefrom. The arm 225 is connected by a bolt 226 to a member 227 provided with an elongated aperture 228 adapted to receive a shaft 229 which is journaled on the frame of the implement and is provided at its outer end with a crank 230.

The shaft 229 is connected in driving relation to the shaft 220 by means of a drive chain 235 trained over a relatively small sprocket 236 on the crank shaft 229 and a relatively large sprocket 237 on the shaft 220. Thus, by turning the crank 230, shaft 229 drives shaft 220 at a relatively slow speed, and this moves the spur gear 217 around the internal gear 215 in an orbit by means of the eccentric disc 219, and since the spur gear 217 is held against rotation by the arm 225, each orbital movement of the spur gear around the internal gear 215 results in an angular movement of the latter, and consequently an angular movement of the supporting beam 35. The vertical movement of the spur gear 217 relative to the crank shaft 229 is accommodated by the elongated slot 228.

Figure 2:
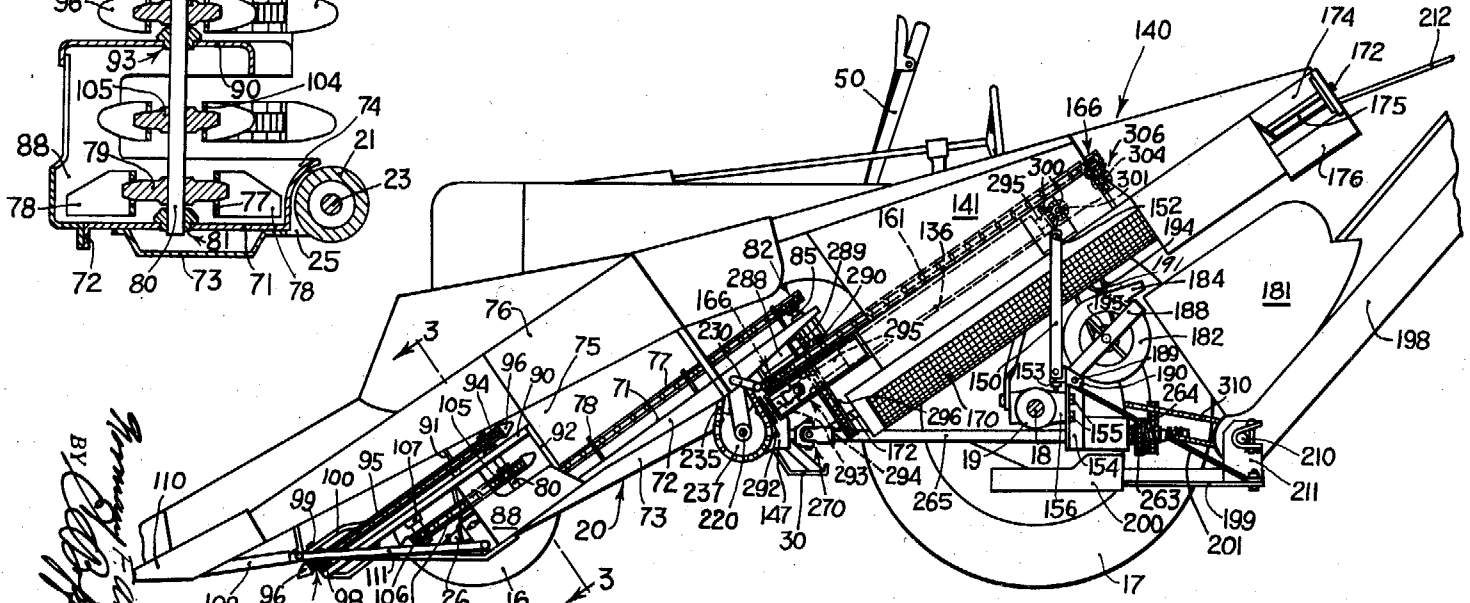
Figure 2 is a side elevational view of the tractor with the implement attachment mounted thereon, the near rear wheel of the tractor being removed to more clearly show the details of the implement attachment.

Assuming a difference of eight teeth between the number of teeth on the internal gear 215 and the spur gear 217, one revolution of the drive shaft 220 will cause an angular movement of the main beam 35 equal to the angle subtended by eight teeth on the gear 215, and in the same direction of rotation. Thus, to raise the implement from the lowered position shown in Figure 5 to the normal position shown in Figure 2, the crank 230 is rotated in a clockwise direction, causing the pipe 35 to rotate in the same direction to wind up the chains 40 and raise the entire implement to normal operating position, in which the pipe 35 rests upon the arms 45, as indicated in Figure 7. Conversely, to lower the implement from normal position to the ground, it is necessary to rotate the crank in a counterclockwise direction to unwind the chains 40.

Figure 4:
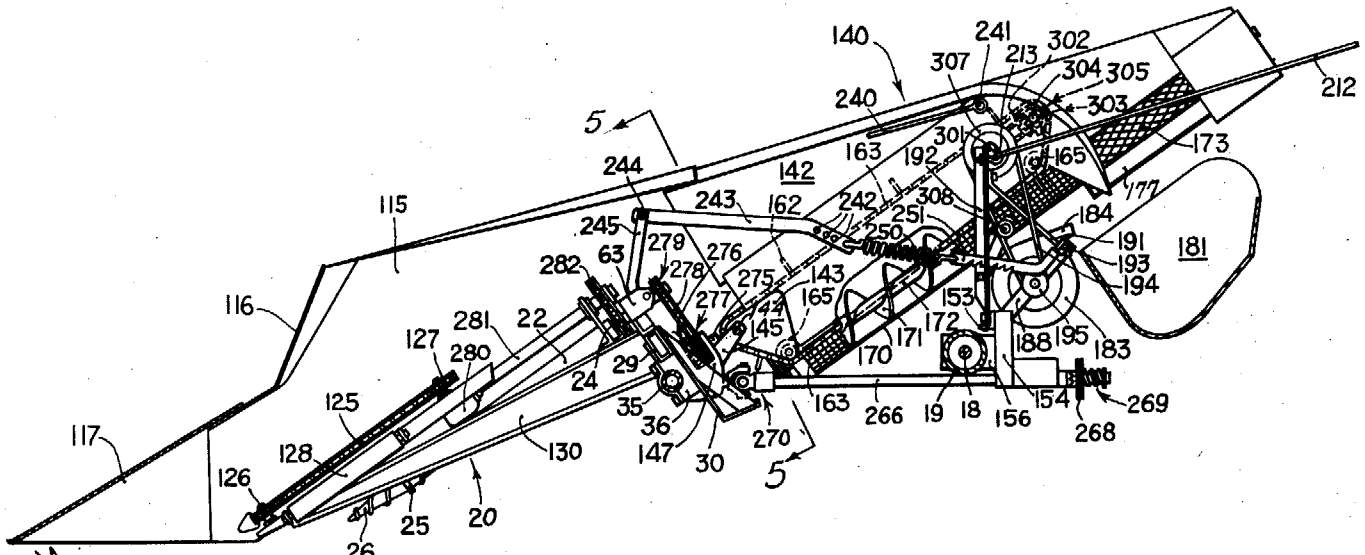
Figure 4 is a sectional elevational view taken along a line 4—4 in Figure 1 and showing the inner side of the harvester unit on the right side of the tractor.

As the implement lowers to the ground the two sections swing relative to each other about the connecting bolt 144 until the supporting legs 30 rest upon the ground, while the rear end of the husking units 140 are still supported on the legs 150, which swing forwardly as the implement lowers. Each of the husking units 140 is provided with a hook 240 swingably connected to a pin 241 on the inner side of the husking units, by means of which the husking units can be held in jack-knifed position with respect to the snapping units when the latter are resting upon the legs 30 to permit the rear end of the husking units to be disconnected from the rear axle housing. Each of the hooks 240 has an outwardly turned forward end which is adapted to hook into one of several holes 242 (see Figure 4), in a link 243 which extends along the inner side of the husking unit and is pivotally connected by a bolt 244 to an arm 245, which is rigidly connected to the plate 63. During operation, the rear end of the link 243 is connected to a tension spring 250, the opposite end of which is attached to a bar 251 adapted to be inserted through an aperture 252 in the post 192 on the rear axle housing of the tractor. The lower edge of the bar 251 is notched, as indicated in Figure 4, to engage the lower edge of the opening 252. When the implement is in mounted position on the tractor, the spring 250 acts as a counterbalancing spring to balance the weight of the snapping unit about the axis of the beam 35, to facilitate vertical adjustment of the picking units 70.

Since the gear mechanism connecting the crank 230 with the beam 35 is self-locking or non-reversible, no additional parts are needed to lock the implement in raised position. All that is necessary to lower the implement from normal position is to turn the crank 230 in a counterclockwise direction until the legs 30 rest upon the ground. Before the implement is lowered, however, it is necessary to release the counterbalancing spring bar 251 from the post 192. After the hooks 240 on each of the husking units have been hooked to the links 243, the supporting legs 150 can be disconnected from the frame member 153. The chains 40 should then be disconnected from the arms 45 and the adjusting links 60 are then disconnected from the plates 63, and after certain power shaft connections have been disconnected, the details of which will be described later, the tractor is ready to be backed away from the implement.

Figure 9:
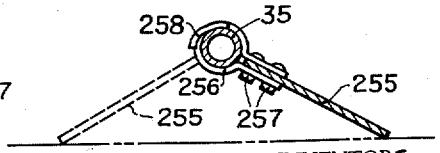
Figure 9 is a sectional elevational view taken along a line 9—9 in Figure 5, showing the details of the ramp for assisting the front tractor wheels to roll over the transverse beam.

It is evident that the front wheels of the tractor must roll over the transverse beam 35 during removal of the tractor from the implement, and to this end, a ramp is provided in the form of a plate 255, swingably connected to the pipe or member 35 by means of U-shaped strap supports 256, fixed to the plate 255 by bolts 257 and embracing the pipe 35. The ramp plate 255 is swingable into an inclined ground engaging position, either in front or in back of the pipe 35, depending upon whether the tractor is being moved into or out of the implement. As indicated in Figure 9, the ramp 255 is in position for the front wheels of the tractor to go over the part 35 when the tractor is moved into the implement, while the dotted lines indicate the position of the plate 255 when the tractor is being moved out of the implement. A short length of spring metal 258 is rigidly fixed, as by welding, at one end to the pipe 35 and is adapted to engage the inner edge of the ramp plate 255 when the implement is being lowered away from the tractor by virtue of the counterclockwise rotation of the pipe 35. Engagement of the spring 258 with the plate 255 causes the latter to swing over the pipe 35 into ground engaging position ahead of the latter, so that the ramp is automatically placed in position for the front wheels of the tractor to be backed out of the implement. Before the tractor is driven into place, the ramp 255 is easily drawn by hand back to a rearwardly inclined position if the spring 258 is first held down against the pipe.

The mechanism on the implement attachment is driven from the tractor power take-off shaft 260, the end of which projects rearwardly out of the tractor axle housing and is suitably splined for receiving a pair of sprockets 261, 262 in driving relation. The two sprockets 261, 262 are connected by chains 263, 264 to drive the gathering and husking mechanisms on opposite sides of the tractor, respectively. The chains 263, 264 are connected to a pair of forwardly extending drive shafts 265, 266, respectively, through sprockets 267, 268, respectively. Any suitable slip clutch mechanism 269 is provided between each of the sprockets 267, 268 and their respective drive shafts 265, 266. The forward ends of the latter are connected through universal joints 270 to gearing within the gear boxes 147, the details of which gearing are not a part of the present invention. The gear box 147 has an output shaft 275, on which are mounted a pair of sprockets 276, 277. The output shaft 275 is substantially parallel to the axes of the snapping rolls 21, 22 and drive the latter through a chain 278 which is trained over the sprocket 277 and over a sprocket 279 fixed to the shaft 24 of the inner snapping roll. The two snapping rolls of each pair are interconnected by suitable gearing (not shown) as is customary, for driving the two snapping rolls in relatively opposite directions.

The inner gatherer chains 125 are driven from a gear box 280 (Figure 4), by power from a forwardly extending power shaft 281 which is driven by a chain 282, which is driven from the shaft 24 of the inner snapping roll 22. Sprocket 276 on shaft 275 drives a chain 285 which is trained over a sprocket 286 fixed to a rearwardly extending shaft 287 journaled in a bearing 288 supported on the under side of the sheet 71. A bevel gear 289 on the rear end of the shaft 287 drives a bevel gear 290 on shaft 85 over which is trained the chain 77 of the ear conveyor alongside the snapping rolls for driving the conveyor. The outer gatherer chains 95, 104 are driven through the conveyor chain 77 and the gatherer chain shaft 80. The chain 285 also passes over a chain-tightening idler 291 and a sprocket 292 fixed on a shaft 293 which drives rearwardly through a universal joint 294, the shaft 295 of one of the husking rolls 136. The shaft 172 of the auger is driven through a chain 296 which is driven from a sprocket on the shaft 295 behind the universal joint 294. The universal joint 294 is disposed substantially in transverse alignment with the axis of the pivot bolt 144 which interconnects the husking and snapping units and thus permits power to be transmitted from the shaft 293 on the snapping unit to the shaft 295 on the husking unit, regardless of the relative angular position of the two units.

The shaft 295 of the outer husking roll is extended rearwardly from the rearward end of the husking roll 136 and is connected through a pair of bevel gears 300 to a transverse shaft 301 which extends through the husking unit and projects from the inner side thereof. The inner end of the shaft 301 is connected by a chain 302 and sprocket 303 to a transverse shaft 304 spaced rearwardly of the shaft 301 and mounted on the shaft 304 is the sprocket 305 which drives the inner conveyor chain 163. The shaft 304 extends across the husking unit and is connected by a pair of bevel gears at 306 to the rear sprocket 166 which drives the conveyor chain 161.

The fan driving belt 194 is trained over a belt pulley 307 fixed on the inner end of the shaft 301. This belt is maintained tight regardless of movement of the husking units by means of a spring actuated idler 308, supported on the post 192.

The elevator chains 202 are driven through a drive chain 310 trained over a sprocket (not shown) on the shaft 210 and extending forwardly to a drive sprocket 311 fixed to a shaft 312 which receives its power from suitable gearing (not shown) within a gear box 313 supported on a frame member 314, which is fixed to a rearwardly extending supporting frame 315 on which the rear end of the power shaft 266 is journaled. The gear box 313 has an input shaft 316 extending rearwardly therefrom, on which is mounted a sprocket 317 over which the chain 264 is trained.

We claim:

1. A harvesting implement comprising a mobile frame, a crop gathering unit pivotally mounted thereon by means providing for vertical movement relative thereto, a crop treating unit associated with said gathering unit for receiving gathered crops therefrom, means for pivotally supporting one end of said treating unit on said frame on an axis spaced from the pivot mounting of said gathering unit, and means for pivotally supporting the other end of said treating unit on said gathering unit.

2. A harvesting implement comprising a tractor having a longitudinally disposed body and transverse axle housings mounted thereon and carried on wheels, a crop gathering unit disposed alongside said body and pivotally mounted thereon by means providing for vertical swinging movement relative thereto, a crop treating unit disposed behind said gathering unit and adapted to receive crops therefrom, means for pivotally supporting one end of said treating unit on one of said tractor axle housings, and means for pivotally supporting the other end of said treating unit on said gathering unit.

3. A corn harvesting implement comprising a tractor having a longitudinally disposed body carried on wheels, a picking unit disposed alongside said body and pivotally mounted at one side thereof by means providing for swinging movement about a transverse axis, means for adjusting the position of said unit about said axis to adjust the height of the forward end, a husking unit disposed behind said picking unit and adapted to receive snapped ears therefrom, means for swingably supporting one end of said husking unit on said tractor for movement about an axis spaced from said transverse axis, and means for swingably supporting the other end of said husking unit on said picking unit.

4. A corn harvesting implement comprising a tractor having a longitudinally disposed body and a pair of opposed laterally extending wheel supported rear axle housings, a snapping unit disposed near the front end of the tractor and extending longitudinally alongside thereof, means for swingably supporting said snapping unit on said body providing for movement about a transverse axis, means for adjusting the position of said unit about said axis to adjust the height of the forward end thereof, a husking unit disposed longitudinally behind said snapping unit and adapted to receive ears therefrom, means for swingably supporting the rear end of said husking unit on said rear axle housing, and means for swingably supporting the front end of the husking unit on said snapping unit to accommodate the swinging movement of the latter during vertical adjustments.

5. A harvesting implement comprising a mobile frame, a crop gathering unit pivotally mounted thereon by means providing for vertical movement relative thereto, gathering mechanism associated with said gathering unit, a crop treating unit including crop treating mechanism for receiving crops from said gathering mechanism, means for pivotally supporting one end of said treating unit on said frame, means for pivotally supporting the other end of said treating unit on said gathering unit, a power driven shaft journaled on said gathering unit, and power transmitting means, journaled on the axis of said pivot means between said units, for connecting said crop treating mechanism to said power shaft on said gathering unit for driving said treating mechanism.

6. A corn harvesting implement comprising a tractor having a longitudinally disposed body carried on wheels, a picking unit disposed alongside said body and pivotally mounted at one side thereof by means providing for swinging movement about a transverse axis, picking mechanism associated with said picking unit and including a power driven shaft journaled on the latter for movement therewith and operatively coupled to the tractor engine to receive power therefrom, a husking unit disposed behind said picking unit and adapted to receive snapped ears therefrom, means for swingably supporting one end of said husking unit on said tractor for movement about an axis spaced from said transverse axis, means for swingably supporting the other end of said husking unit on said picking unit, husking mechanism associated with said husking unit, and flexible power transmitting means interconnecting said power driven shaft on said picking unit with said husking mechanism.

7. A corn picker comprising a mobile frame, an upwardly and rearwardly inclined picker unit on said frame, an elevator disposed alongside the upper portion of said picker unit, an upwardly and rearwardly inclined husking unit on said frame, the forward end thereof being disposed directly below said elevator to receive crop therefrom, and the rearward end thereof being disposed in an elevated position, and a final elevator having a hopper disposed below the elevated end of said husking unit.

8. The combination with a tractor having a narrow longitudinally extending body, and a rear axle housing extending laterally therefrom, of a corn picker comprising a picking unit mounted on said tractor body adjacent the forward end in an upwardly and rearwardly inclined position, an elevator disposed alongside the upper portion of said picking unit for conveying ears from said picking unit, a husking unit having a receiving end disposed below the delivery end of said elevator and extending upwardly and rearwardly over said axle housing, and endless conveyor means for moving the ears through said husking unit.

9. In a machine of the class described, a pair of cooperative snapping rolls, and a conveyor for receiving ears of corn from said rolls and conveying the same to a point of delivery, said conveyor comprising an endless conveyor chain having ear engaging paddles, a sprocket near the forward end of said pair of rolls, a second sprocket disposed adjacent the point of delivery of said conveyor, said chain engaging said two sprockets for conveying material therebetween, and a third sprocket spaced laterally from said second sprocket and over which said chain is trained around to provide a substantially 90 degree turn at the said point of delivery.

10. The combination set forth in claim 9, including the further provision of a trough in which said conveyor moves the ears of corn, said trough being inclined downwardly and away from said second sprocket to cause the ears to slide away from the paddles as the latter swing around said second sprocket.

11. A corn harvesting implement comprising a tractor having a longitudinally disposed body and a pair of opposed laterally extending wheel supported rear axle housings, a snapping unit disposed near the front end of the tractor and extending longitudinally alongside thereof, means for swingably supporting said snapping unit providing for movement about a transverse axis, means for adjusting the position of said unit about said axis to adjust the height of the forward end thereof, a husking unit disposed longitudinally behind said snapping unit and adapted to receive ears therefrom, means for swingably supporting the rear end of said husking unit on said rear axle housing for movement about an axis spaced from said transverse axis, means for swingably supporting the front end of the husking unit on said snapping unit to accommodate the swinging movement of the latter during vertical adjustments, said husking unit having a corn discharge chute adjacent the rear end thereof behind the tractor axle, a receptacle disposed behind said axle under said discharge chute for receiving corn therefrom, and a fan rigidly mounted on said rear axle housing and having a discharge duct adapted to direct an air blast rearwardly between said husking unit and said receptacle through the corn falling into the latter.

12. In an implement attachment for a tractor, the combination of a main supporting beam journaled on said implement attachment, flexible lifting means attached to said beam and adapted for connection to said tractor, means for rotating said beam to wind said lifting means thereon to raise said implement from inoperative position resting on the ground to normal operating position on the tractor, and a tilting lever attached to said implement attachment to rock the same about the axis of said beam during operation.

13. An implement attachment for a tractor comprising in combination, a main supporting beam adapted to be transversely positioned beneath a tractor, a pair of implements supported on said beam in laterally spaced relation to receive said tractor therebetween, said implements being journaled on the beam to permit rotation of the latter, flexible lifting means attached to said beam and adapted for connection to the tractor, and means for rotating said beam to wind said lifting means thereon.

14. An implement attachment for a tractor comprising in combination, a main supporting beam adapted to be transversely positioned beneath a tractor between the front and rear wheels thereof, a pair of implements supported on said beam in laterally spaced relation to receive said tractor therebetween, said implements being journaled on the beam to permit rotation of the latter, flexible lifting means attached to said beam and adapted for connection to the tractor, means for rotating said beam to wind said lifting means thereon, and ramp means swingably mounted on said beam between said implements and adapted to swing into inclined ground engaging position either in front or rear of said beam to assist the front wheels of the tractor to roll over the latter.

15. The combination set forth in claim 14, further characterized by means fixed on said beam and rotatable therewith into engagement with said ramp during lowering of the implement to swing said ramp to a position in front of said beam.

16. An implement attachment for a tractor comprising a frame having means for supporting the same on a tractor and adapted to extend forwardly adjacent a front wheel of the tractor, and a guard roller journaled on said frame and disposed to engage said front wheel when the latter is turned against said frame.

17. An agricultural implement comprising a mobile frame, a primary implement unit pivotally mounted thereon by means providing for vertical movement relative thereto, a secondary implement unit pivotally supported on one end on said primary unit and pivotally supported on the other end on said frame for swinging movement about an axis spaced from the pivot axis of said primary unit.

18. An agricultural implement comprising a mobile frame, a primary implement unit pivotally mounted thereon by means providing for vertical movement relative thereto, a secondary implement unit pivotally supported on one end on said primary unit and link means pivotally connected to the other end of said secondary unit and to said frame for supporting said other end of said secondary unit and to provide for bodily movement of the secondary unit relative to the frame.

19. The combination with a mobile frame, of a detachable implement, extensible means on said implement adapted to be connected to said frame when the implement is detached therefrom and lying on the ground, including a self locking jack mounted on said implement for retracting said extensible means to draw and lock said implement into normal operating position on said frame.

20. The combination with a mobile frame, of a detachable implement, a support rotatably mounted on said implement, a bracket on said frame provided with a recess for receiving said support, flexible means connected to said support and to said bracket adjacent said recess, whereby when said support is rotated to wind said flexible means thereon, said support will be raised and guided into said recess.

21. In a corn picker, a pair of longitudinally extending snapping rolls and a supporting frame to which said rolls are connected including a pair of tubular members disposed along the outer sides of said rolls, said members having forwardly converging top and bottom sides, and a transverse member behind said rolls interconnecting said tubular members.

22. In a corn picker, a gatherer frame comprising a tubular frame member disposed transversely of the direction of movement, a pair of substantially parallel tubular frame members rigidly attached to said transverse members and extending forwardly therefrom, the vertical dimension of said tubular members tapering toward the forward end thereof, and a pair of snapping rolls disposed between said parallel members and supported thereon.

23. The combination with a mobile frame, of a detachable implement frame, a rotatable winding member journaled on one of said frames, a flexible lifting member interconnecting said winding member with the other of said frames, means for rotating said winding member to raise said implement frame into operating position, and means for adjusting said implement frame angularly relative to said mobile frame during operation about the axis of rotation of said winding member.

24. The combination with a tractor having a wheel supported frame, of a harvesting implement having a frame adapted to be detachably mounted on said tractor in a longitudinally extending position adjacent the side of the tractor frame and including forwardly extending crop gathering means, a transversely disposed winding member journaled on one of said frames, a flexible lifting member interconnecting said winding member with the other of said frames, means for rotating said winding member to raise said implement frame into operating position, and means for swinging said implement frame relative to said tractor frame about the axis of rotation of said winding member to raise and lower said crop gathering means.

25. The combination with a mobile frame, of a detachable implement comprising primary and secondary frames pivotally connected together, a rotatable winding member journaled on said primary implement frame, a flexible lifting member interconnecting said winding member and said mobile frame, means for rotating said winding member to wind said flexible member thereon to raise the pivotally connected ends of said frames into operating position on said mobile frame, means for adjusting said primary implement frame angularly about the axis of said winding member to control the operating position thereof, and means for swingably supporting the opposite end of said secondary implement frame on said mobile frame.

26. The combination with a mobile frame, of a detachable implement comprising primary and secondary frames pivotally connected together by means providing for relative vertical swinging movement, a rotatable winding member journaled on said primary implement frame, a flexible lifting member interconnecting said winding member and said mobile frame, means for rotating said winding member to wind said flexible member thereon to raise the pivotally connected ends of said frames from the ground into operating position on said mobile frame, means for adjusting said primary implement frame angularly about the axis of said winding member to control the operating position thereof, and means for swingably supporting the outer end of said secondary frame on said mobile frame providing for vertical swinging movement and longitudinal shifting movement relative thereto to permit lifting and lowering said pivotally connected ends of said frames with said outer end of the secondary frame supported on said mobile frame.

27. The combination with a tractor having a wheel supported frame, of a harvesting implement having a frame comprising articulated crop gathering and crop treating frames swingable vertically relative to each other and extending longitudinally along a side of said tractor frame, a transversely disposed winding member journaled on said gathering frame, a flexible lifting member interconnecting said winding member and said tractor frame, means for rotating said winding member to wind said flexible member thereon to raise the connected ends of said implement frames from the ground into operating position on the tractor, means for adjusting said gathering frame angularly about the axis of said winding member in said operating position to raise and lower the outer end thereof, and means for swingably supporting the outer end of said treating frame on said tractor providing for vertical swinging movement and longitudinal shifting movement relative thereto to permit lifting and lowering the articulated ends of said implement frames with said outer end of the treating frame supported on said tractor frame.

28. For use with a tractor including a body and a wheel supported rear axle housing, a corn picker of the tractor mounted type comprising an articulated frame having a front section and a rear section pivoted together about a transverse axis, means for supporting said frame alongside said tractor body inside the plane of one of the tractor wheels with the axis of said pivot connection normally fixed with respect to said tractor body and disposed substantially midway of the longitudinal dimension of the tractor, gathering and picking mechanism mounted on said front section, husking mechanism mounted on said rear section, said rear section being inclined upwardly and rearwardly from said pivot connection over the rear axle housing of the tractor, and means for swingably supporting said rear section on said rear axle housing.

29. For use with a tractor including a body and a wheel supported rear axle housing, a corn picker of the tractor mounted type comprising an articulated frame having a front section and a rear section pivoted together about a transverse axis, lifting means for raising the pivoted ends of said sections from an inoperative position on the ground to a normal operating position on the tractor alongside the tractor body inside the plane of one of the tractor wheels with the axis of said pivot connection in normally fixed position substantially midway of the longitudinal dimension of the tractor, gathering and picking mechanism mounted on said front section, cleaning mechanism mounted on said rear section, said rear section being inclined upwardly and rearwardly from said pivot connection over the rear axle housing of the tractor, and means for swingably supporting said rear section on said rear axle housing providing for downward and forward movement of said rear section to a position ahead of said axle housing when said pivoted ends are lowered to said grounded position, permitting the tractor to be backed away from the corn picker after the latter has been disconnected therefrom.

30. For use with a tractor including a body and a wheel supported rear axle housing, a corn picker of the tractor mounted type comprising an articulated frame having a front section and a rear section pivoted together about a transverse axis, lifting means for raising the pivoted ends of said sections from an inoperative position on the ground to a normal operating position on the tractor alongside the tractor body inside the plane of one of the tractor wheels with the axis of said pivot connection in normally fixed position substantially midway of the longitudinal dimension of the tractor, gathering and picking mechanism mounted on said front section, cleaning mechanism mounted on said rear section, said rear section extending rearwardly from said pivot connection over the rear axle housing of the tractor, and means for swingably supporting said rear section on said rear axle housing providing for downward and forward movement of said rear section to a position ahead of said axle housing when said pivoted ends are lowered to said grounded position, permitting the tractor to be backed away from the corn picker after the latter has been disconnected therefrom.

31. The combination set forth in claim 30, further characterized in that said lifting means comprises a winding member journaled on said corn picker coaxial with said articulated connection and a flexible member attachable to said tractor and adapted to wind on said member.

32. The combination set forth in claim 30, further including means under control of the tractor operator for adjusting said front section angularly about the axis of said pivot connection after the latter has been raised to normal operating position.

33. The combination set forth in claim 30, including the further provision of means for fixing said front and rear sections together after the corn picker has been lowered to the ground, whereby said rear section is supported on said front section to sustain the rear section in upwardly and rearwardly inclined position after the tractor has been disconnected therefrom and backed away from said corn picker.

34. The combination set forth in claim 29, including the further provision of a fan rigidly mounted on said rear axle housing and projecting above the upper side of the latter beneath the inclined rear section and having a discharge duct adapted to direct an air blast rearwardly through corn falling from said cleaning mechanism, said fan being positioned to avoid engagement with said rear section as the latter swings forwardly into said inoperative position.

35. An implement attachment for a tractor comprising in combination, a frame including a beam adapted to extend transversely beneath the tractor between the front and rear wheels of the latter, said beam being shiftable relative to the tractor between a raised operating position and an inoperative position on the ground, means shiftably mounted on said beam adapted to engage certain of the tractor wheels to facilitate movement of the latter over said beam, said shiftable means being movable to one position for use when the tractor is being moved away from said implement attachment and movable to another position for use when the tractor is being moved toward said attachment, and control means operable from a remote position for shifting said shiftable means to one of said positions.

36. An implement attachment for a tractor comprising in combination, a frame including a beam adapted to extend transversely beneath the tractor between the front and rear wheels of the latter, said beam being shiftable relative to the tractor between a raised operating position and an inoperative position on the ground, ramp means shiftably mounted on said beam and engageable with certain of the tractor wheels to facilitate movement of the latter over said beam, said ramp means being movable from one side of said beam to the other to accommodate movements of the tractor over the beam in opposite directions, respectively, and control means operable from a remote position for shifting said ramp means to one side of said beam.

37. An implement attachment for a tractor comprising in combination, a frame including a beam adapted to extend transversely beneath the tractor between the front and rear wheels of the latter, said beam being shiftable relative to the tractor between a raised operating position and an inoperative position on the ground, ramp means shiftably mounted on said beam and engageable with certain of the tractor wheels to facilitate movement of the latter over said beam, said ramp means being movable from one side of said beam to the other to accommodate movements of the tractor over the beam in opposite directions, respectively, and control means, responsive to movement of said beam from raised position to grounded position for shifting said ramp means to a position facilitating movement of the tractor away from said implement attachment.

38. An implement attachment for a tractor comprising in combination, a frame including a beam adapted to extend transversely beneath the tractor between the front and rear wheels of the latter, said beam being shiftable relative to the tractor between a raised operating position and an inoperative position on the ground, ramp means swingably mounted on said beam between a forwardly inclined position in engagement with the ground and a rearwardly inclined position in engagement with the ground to facilitate movement of certain of the tractor wheels over said beam as the tractor is moved relative to the implement when the latter is in said inoperative position, and control means responsive to movement of said beam when the latter is lowered to the ground, for shifting said ramp means to a position facilitating movement of the tractor away from said implement attachment.

39. In combination, a tractor having a body, a mounting member secured thereto and having a slot, a lifting member pivotally mounted on the mounting member, an implement having a connecting portion engageable with the mounting member and receivable in the slot therein, means for angularly moving the lifting member to shift the implement between an operative position in which it is raised and mounted upon the tractor with the connecting portion thereof positioned in the slot in the mounting member and an inoperative position in which it rests upon the ground, and means for fixing the lifting member to the mounting member in raised position of the implement to maintain the implement in this position by holding the said connecting portion of the implement in the slot.

40. In combination, a tractor having a body, a mounting member secured thereto and having a slot having an open end, a lifting member pivotally mounted on the mounting member for movement to and from a position in which it closes the open end of the slot, an implement having a connecting portion engageable with the mounting member and receivable in the slot therein, means for angularly moving the lifting member to its said position to raise the implement to an operative position in which it is mounted upon the tractor with the connecting portion thereof positioned in the slot in the mounting member from an inoperative position in which it rests upon the ground, and means for fixing the lifting member to the mounting member in raised position of the implement with the lifting member closing the open end of the slot in the mounting member to maintain the said connecting portion of the implement in the slot.

41. In combination, a tractor having a body, a mounting member secured thereto and having a recess, a lifting member pivotally mounted on the mounting member, an implement having a connecting portion engageable with the mounting member and receivable in the recess therein, means for angularly moving the lifting member to shift the implement between an operative position in which it is raised and mounted upon the tractor with the connecting portion thereof positioned in the recess in the mounting member and an inoperative position in which it rests upon the ground, and means for fixing the lifting member relative to the mounting member in raised position of the implement to maintain the implement in this position by holding the said connecting portion of the implement in the recess.

NORMAN F. ANDREWS.
RUSSELL L. DORT.

REFERENCES CITED

The following references are of record in the file of this patent:

UNITED STATES PATENTS

| Number | Name | Date |
|---|---|---|
| 1,404,069 | Swinehart | Jan. 17, 1922 |